(12) United States Patent
Riley et al.

(10) Patent No.: US 8,750,279 B2
(45) Date of Patent: *Jun. 10, 2014

(54) PCMM APPLICATION MANAGER

(75) Inventors: Yusun Kim Riley, Marlborough, MA (US); Ajit Nair, Westford, MA (US); Michael Mercurio, Jamaica Plan, MA (US)

(73) Assignee: Camiant, Inc., Marlborough, MA (US)

( * ) Notice: Subject to any disclaimer, the term of this patent is extended or adjusted under 35 U.S.C. 154(b) by 49 days.

This patent is subject to a terminal disclaimer.

(21) Appl. No.: 12/757,544

(22) Filed: Apr. 9, 2010

(65) Prior Publication Data
US 2010/0316064 A1    Dec. 16, 2010

Related U.S. Application Data

(63) Continuation of application No. 10/867,158, filed on Jun. 14, 2004, now Pat. No. 7,738,440.

(60) Provisional application No. 60/477,970, filed on Jun. 12, 2003, provisional application No. 60/547,208, filed on Feb. 24, 2004.

(51) Int. Cl.
*H04B 7/22* (2006.01)

(52) U.S. Cl.
USPC .............................. 370/348; 370/235

(58) Field of Classification Search
USPC ........... 370/230.1, 235, 236, 236.1, 328, 329, 370/338, 341, 348, 352, 395.21, 468
See application file for complete search history.

(56) References Cited

U.S. PATENT DOCUMENTS

| 5,809,239 A | 9/1998 | Dan et al. |
| 5,822,534 A | 10/1998 | Yamunachari et al. |

(Continued)

FOREIGN PATENT DOCUMENTS

| AU | 2004247256 B2 | 11/2010 |
| AU | 2005208846 B2 | 2/2011 |

(Continued)

OTHER PUBLICATIONS

Ed Miller, et al, "the packetCable Architecture" IEEE Communications Magazine, IEEE Service Center, Piscataway, US, vol. 39, No. 6, Jun. 2001 pp. 90-96.*

(Continued)

*Primary Examiner* — Fan Tsang
*Assistant Examiner* — Akelaw Teshale
(74) *Attorney, Agent, or Firm* — Jenkins, Wilson, Taylor & Hunt, P.A.

(57) ABSTRACT

A method of assigning network resources between network endpoints includes providing a session initiation request to an application manager. The application manager is logically and physically decoupled from an application server associated with the network endpoints. This request initiates communication between the network endpoints through the set of network resources. The communication employs an application residing on an application server. The method also includes providing a PCMM message from the application manager to a policy server as a result of the session initiation request. The PCMM message includes at least some information, for example QoS information, embedded in the session initiation request. The method further includes selecting, via the policy server, a set of network resources for creating a path connecting the network endpoints. The policy server selects the set of network assets based on the PCMM message, for example to set QoS for the communication between the two endpoints.

13 Claims, 4 Drawing Sheets

(56) References Cited

U.S. PATENT DOCUMENTS

| | | |
|---|---|---|
| 5,835,720 A | 11/1998 | Nelson |
| 5,878,115 A | 3/1999 | Valentine et al. |
| 6,023,725 A | 2/2000 | Ozawa et al. |
| 6,046,981 A | 4/2000 | Ramamurthy et al. |
| 6,067,457 A | 5/2000 | Erickson et al. |
| 6,076,108 A | 6/2000 | Courts et al. |
| 6,128,644 A | 10/2000 | Nozaki |
| 6,130,898 A | 10/2000 | Kostreski et al. |
| 6,167,445 A | 12/2000 | Gai et al. |
| 6,201,790 B1 | 3/2001 | Teboul |
| 6,324,184 B1 | 11/2001 | Hou et al. |
| 6,366,577 B1 * | 4/2002 | Donovan ............... 370/352 |
| 6,385,454 B1 | 5/2002 | Bahl et al. |
| 6,463,454 B1 | 10/2002 | Lumelsky et al. |
| 6,466,980 B1 | 10/2002 | Lumelsky et al. |
| 6,571,288 B1 | 5/2003 | Sarukkai |
| 6,578,076 B1 * | 6/2003 | Putzolu ............... 709/223 |
| 6,594,826 B1 | 7/2003 | Rao et al. |
| 6,597,920 B2 | 7/2003 | Yegani et al. |
| 6,680,922 B1 | 1/2004 | Jorgensen |
| 6,708,209 B1 * | 3/2004 | Ebata et al. ............. 709/223 |
| 6,728,887 B1 | 4/2004 | Dziekan et al. |
| 6,731,932 B1 | 5/2004 | Rune et al. |
| 6,738,390 B1 | 5/2004 | Xu et al. |
| 6,745,043 B1 | 6/2004 | Lester et al. |
| 6,771,595 B1 | 8/2004 | Gilbert et al. |
| 6,771,639 B1 | 8/2004 | Holden |
| 6,798,757 B2 | 9/2004 | Mizutani |
| 6,804,717 B1 | 10/2004 | Bakshi et al. |
| 6,898,641 B1 | 5/2005 | Kobayashi |
| 6,930,984 B1 | 8/2005 | Nomura et al. |
| 6,947,378 B2 | 9/2005 | Wu et al. |
| 6,973,488 B1 | 12/2005 | Yavatkar et al. |
| 6,975,594 B1 * | 12/2005 | Byers ............... 370/238 |
| 6,988,148 B1 | 1/2006 | Sheth |
| 7,024,199 B1 | 4/2006 | Massie et al. |
| 7,027,391 B2 | 4/2006 | Sahinoglu et al. |
| 7,126,920 B2 | 10/2006 | Venkatesulu et al. |
| 7,139,813 B1 | 11/2006 | Wallenius |
| 7,143,433 B1 | 11/2006 | Duan et al. |
| 7,168,086 B1 | 1/2007 | Carpenter et al. |
| 7,174,375 B2 | 2/2007 | King et al. |
| 7,236,791 B2 | 6/2007 | Dwayne et al. |
| 7,274,662 B1 * | 9/2007 | Kalmanek et al. ........ 370/230 |
| 7,319,691 B2 * | 1/2008 | Qing et al. ............. 370/351 |
| 7,330,710 B1 | 2/2008 | Xu et al. |
| 7,430,187 B2 | 9/2008 | Holt et al. |
| 7,451,475 B1 | 11/2008 | Oz et al. |
| 7,738,440 B2 | 6/2010 | Riley et al. |
| 7,805,515 B2 | 9/2010 | Riley |
| 7,904,541 B2 | 3/2011 | Swildens et al. |
| 8,595,787 B2 | 11/2013 | Riley et al. |
| 8,619,630 B2 | 12/2013 | Riley et al. |
| 2001/0042097 A1 | 11/2001 | Lapine |
| 2002/0010938 A1 | 1/2002 | Zhang et al. |
| 2002/0032794 A1 | 3/2002 | Nishida et al. |
| 2002/0036983 A1 | 3/2002 | Widegren et al. |
| 2002/0042924 A1 | 4/2002 | Adams |
| 2002/0059274 A1 | 5/2002 | Hartsell |
| 2002/0122422 A1 * | 9/2002 | Kenney et al. ............. 370/392 |
| 2002/0126633 A1 | 9/2002 | Mizutani et al. |
| 2002/0126699 A1 | 9/2002 | Cloonan |
| 2002/0150044 A1 | 10/2002 | Wu et al. |
| 2002/0151312 A1 | 10/2002 | Rosemarijn Bos et al. |
| 2002/0169794 A1 | 11/2002 | Jones |
| 2003/0055971 A1 | 3/2003 | Menon |
| 2003/0069954 A1 | 4/2003 | Ma |
| 2003/0069972 A1 | 4/2003 | Yoshimura et al. |
| 2003/0086425 A1 | 5/2003 | Bearden et al. |
| 2003/0204856 A1 | 10/2003 | Buxton |
| 2003/0208609 A1 | 11/2003 | Brusca |
| 2003/0217368 A1 | 11/2003 | Ramaswamy |
| 2003/0229692 A1 | 12/2003 | Vo |
| 2004/0015986 A1 | 1/2004 | Carver et al. |
| 2004/0039803 A1 | 2/2004 | Law |
| 2004/0044762 A1 * | 3/2004 | Peacock ............... 709/224 |
| 2004/0083267 A1 | 4/2004 | Thompson |
| 2004/0125779 A1 | 7/2004 | Kelton et al. |
| 2004/0213166 A1 | 10/2004 | Rambaldi |
| 2004/0225687 A1 | 11/2004 | Larsson et al. |
| 2005/0039213 A1 | 2/2005 | Matarese et al. |
| 2005/0053085 A1 | 3/2005 | Doh et al. |
| 2005/0076336 A1 * | 4/2005 | Cutrell et al. ........... 718/100 |
| 2005/0091505 A1 | 4/2005 | Riley et al. |
| 2005/0120128 A1 * | 6/2005 | Willes et al. ........... 709/232 |
| 2005/0149940 A1 | 7/2005 | Calinescu et al. |
| 2005/0163060 A1 | 7/2005 | Riley et al. |
| 2005/0188415 A1 | 8/2005 | Riley |
| 2005/0289619 A1 | 12/2005 | Melby |
| 2006/0038877 A1 | 2/2006 | Richardson et al. |
| 2006/0068762 A1 | 3/2006 | Baldwin et al. |
| 2007/0043558 A1 | 2/2007 | Scharz et al. |
| 2007/0047478 A1 | 3/2007 | Balachandran et al. |
| 2007/0149203 A1 | 6/2007 | Sliva |
| 2008/0125152 A1 | 5/2008 | Hou |
| 2008/0151881 A1 | 6/2008 | Liu et al. |
| 2009/0196269 A1 | 8/2009 | Agarwal et al. |
| 2010/0306369 A1 | 12/2010 | Riley |

FOREIGN PATENT DOCUMENTS

| | | |
|---|---|---|
| AU | 2005208847 B2 | 3/2011 |
| EP | 1 631 917 B1 | 12/2010 |
| JP | 4582346 | 9/2010 |
| KR | 10-2001-0027383 | 4/2001 |
| WO | WO 00/11879 | 3/2000 |
| WO | WO 00/79794 A2 | 12/2000 |
| WO | WO 2003/009629 | 1/2003 |
| WO | WO 03/042856 A2 | 5/2003 |
| WO | WO 03/052993 A2 | 6/2003 |
| WO | WO 2005/033899 A2 | 4/2005 |
| WO | WO 2005/072320 A2 | 8/2005 |
| WO | WO 2008/072321 A2 | 8/2005 |

OTHER PUBLICATIONS

Ed Miller ,et al ,"the packetCable Architecture" IEEE Communications Magazine ,IEEE Service Center,Piscataway, US,vol. 39,No. 6,Jun. 2001 pp. 90-96.*
Notice of Allowance for JP 2006-533793 (Jul. 20, 2010).
Official Action for U.S. Appl. No. 10/867,159 (Jul. 19, 2010).
Examiner's Answer for U.S. Appl. No. 10/867,157 (Jul. 8, 2010).
Communication under Rule 71(3)EPC for European Application No. 04755299.7 (Jun. 21, 2010).
Communication pursuant to Article 94(3) EPC for European application No. 04755130.4 (Apr. 27, 2010).
Notice of Allowance and Fee(s) Due for U.S. Appl. No. 10/867,158 (Jan. 15, 2010).
Notification of Non-Compliant Appeal Brief for U.S. Appl. No. 10/867,159 (Jan. 15, 2010).
Notice of Panel Decision from Pre-Appeal Brief Review for U.S. Appl. No. 10/867,157 (Dec. 18, 2009).
Advisory Action for U.S. Appl. No. 10/867,157 (Sep. 23, 2009).
Japanese Official Action issued for 2006-533793, 1 page (Sep. 15, 2009).
Notification of Non-Compliant Appeal Brief for U.S. Appl. No. 10/867,159 (Aug. 26, 2009).
Notice of Allowance and Fee(s) Due for U.S. Appl. No. 10/867,158 (Aug. 5, 2009).
European Search Report issued for European Application No. 05797862 (Jun. 3, 2009).
Final Official Action for U.S. Appl. No. 10/867,157 (Apr. 17, 2009).
Australian Examiner's Report issued for Application No. 2004247256 (Nov. 18, 2008).
Advisory Action for U.S. Appl. No. 10/867,159 (Oct. 22, 2008).
Official Action for U.S. Appl. No. 10/867,158 (Oct. 17, 2008).
Official Action for U.S. Appl. No. 10/867,157 (Sep. 26, 2008).
Final Official Action for U.S. Appl. No. 10/867,159 (May 16, 2008).
Final Official Action for U.S. Appl. No. 10/867,157 (Mar. 24, 2008).
Official Action for U.S. Appl. No. 10/867,159 (Oct. 4, 2007).
Official Action for U.S. Appl. No. 10/867,157 (Sep. 20, 2007).

(56) References Cited

OTHER PUBLICATIONS

European Patent Office, Supplementary European Search Report for European Patent Application No. 04755130.4 (Sep. 4, 2007).
European Patent Office, European Search Report for PCT/US2004/019024, 4 pages (Mar. 15, 2007).
"Data Over Cable System Interface Specification Quality of Service Management Information Base (DOCSIS-QOS MIB)," (Feb. 2005).
International Search Report for International Application No. PCT/US04/19024 (Dec. 9, 2004).
"PacketCable Dynamic Quality-of-Service-Specification," PKKT-SP-DQOS-I09-040402, I09 (Apr. 2, 2004).
"PacketCable Multimedia Architecture Framework Technical Report," PKT-TR-MM-ARCH-V01-030627, V01 (Jun. 27, 2003).
"PacketCable Multimedia Specification," PKT-SP-MM-I01 (Jun. 27, 2003).
"SIP: Session Initiation Protocol," RFC 3261 (Jun. 2002).
Kutscher et al., "Session Description and Capability Negotiation Draft-IEFT-Music-SDPNG-03. TXT" IETF Request for Comments, pp. 1-61, XP002205059 (Nov. 21, 2001).
Ed Miller et al., "The PacketCable Architecture," IEEE Communications Magazine, IEEE Service Center, Piscataway, US, vol. 39, No. 6, pp. 90-96, XP011091736 ISSN: 0163-6804 (Jun. 2001).
"PacketCable 1.2 Architecture Framework Technical Report," PKT-TR-ARCH1.2-V01-001229, V01 (Dec. 29, 2000).
"SDP: Session Description Protocol," RFC 2327 (Apr. 1998).
"Specification of Guaranteed Quality of Service," RFC 2212 (Sep. 1997).
"Specification of the Controlled-Load Network Element Service," RFC 2211 (Sep. 1997).
"Cable Modem Termination System— Network Side Interface Specification," SP-CMTS-NSII01-960702, I01 (Jul. 2, 1996).
"The Use of RSVP with IETF Integrated Services," RFC 2210 (Sep. 1991).
Commonly-assigned, co-pending U.S. Appl. No. 11/041,918 (Filed Jan. 24, 2005).
Commonly-assigned, co-pending U.S. Appl. No. 11/041,779 (Filed Jan. 24, 2005).
Final Official Action for U.S. Appl. No. 12/051,374 (Jul. 11, 2011).
Non-Final Official Action for U.S. Appl. No. 12/646,542 (Mar. 24, 2011).
Official Action for U.S. Appl. No. 10/867,159 (Mar. 21, 2011).
Interview Summary for U.S. Appl. No. 12/051,374 (Mar. 3, 2011).
Official Action for U.S. Appl. No. 12/051,374 (Jan. 10, 2011).
Certificate of Patent for Japanese Patent Application No. 2006-551387 (Dec. 24, 2010).
Official Action for Japanese Application No. 2006-551384 (Dec. 20, 2010).
Notice of Acceptance for Australian Patent Application No. 2005208847 (Nov. 22, 2010).
Allowance Notice for Japanese Patent Application No. 2006-551387 (Nov. 16, 2010).
Notice of Acceptance for Australian Patent Application No. 2005208846 (Oct. 27, 2010).
Examiner's Report for Australian Patent Application No. 2005208847 (Oct. 14, 2010).
Communication of European publication number and information on the application of Article 67(3) EPC for European application No. 09709156.5 (Oct. 13, 2010).
Supplementary European Search Report for European Application No. 05706071.7 (Sep. 8, 2010).
Official Action for Japanese Patent Application No. 2006-551387 (Jul. 6, 2010).
Supplemental Notice of Allowability for U.S. Appl. No. 11/041,918 (Jun. 10, 2010).
Notice of Allowance and Fee(s) Due for U.S. Appl. No. 11/041,918 (Apr. 21, 2010).
Official Action for Japanese Patent Application No. 2006-551387 (Mar. 15, 2010).

Notification of Transmittal of the International Search Report and the Written Opinion of the International Searching Authority, or the Declaration of International Application No. PCT/US2009/032746 (Aug. 26, 2009).
Non-Final Official Action for U.S. Appl. No. 11/041,918 (Aug. 25, 2009).
Final Official Action for U.S. Appl. No. 11/041,779 (Jun. 24, 2009).
Examiner's Report for Australian Patent Application No. 2005208847 (Feb. 27, 2009).
Examiner's First Report for Australian Patent Application No. 2005208846 (Jan. 15, 2009).
Final Official Action for U.S. Appl. No. 11/041,918 (Dec. 22, 2008).
Supplementary European Search Report for European Application No. EP05706073.3 (Oct. 6, 2008).
Non-Final Official Action for U.S. Appl. No. 11/041,779 (Aug. 21, 2008).
Non-Final Official Action for U.S. Appl. No. 11/041,918 (May 6, 2008).
Notification of Transmittal of the International Search Report and the Written Opinion of the International Searching Authority, or the Declaration for International Application No. PCT/US05/02260 (Apr. 26, 2007).
Notification of European publication number and information on the application of Article 67(3) EPC for European Application No. 05706073.3 (Nov. 15, 2006).
Notification of Transmittal of the International Search Report and the Written Opinion of the International Search Authority, or the Declaration for International Application No. PCT/US05/02264 (Sep. 7, 2006).
Notification of European publication number and information on the application of Article 67(3) EPC for European Application No. 05706071.7 (Sep. 6, 2006).
Schulzrinne et al., "Real Time Streaming Protocol (RTSP)," RFC 2326, pp. 1-92 (Apr. 1998).
Braden et al., "Resource ReSerVation Protocol (RSVP)— Version 1 Functional Specification," RFC 2205, pp. 1-112 (Sep. 1997).
Rose et al, "Concise MIB Definitions," RFC 1212, pp. 1-19 (Mar. 1991).
Case et al, "A Simple Network Management Protocol (SNMP)," RFC 1157, pp. 1-36 (May 1990).
Rose et al, "Structure and Identification of Management Information for TCP/IP-based Internets," RFC 1155, pp. 1-22 (May 1990).
Final Official Action for U.S. Appl. No. 10/867,159 (Jul. 16, 2012).
Second Office Action for Canadian Application No. 2,528,648 (May 22, 2012).
First Office Action for Canadian Application No. 2 528 871 (Jan. 24, 2012).
Non-Final Official Action for U.S. Appl. No. 12/051,374 (Jan. 18, 2012).
Final Official Action for U.S. Appl. No. 12/646,542 (Oct. 25, 2011).
Interview Summary for U.S. Appl. No. 12/051,374 (Oct. 20, 2011).
First Office Action for Canadian Patent Application No. 2,528,648 (Aug. 12, 2011).
Notice of Panel Decision from Pre-Appeal Brief Review for U.S. Appl. No. 10/867,159 (May 30, 2013).
Notice of Allowance for Canadian Application No. 2,528,871 (May 21, 2013).
Decision on Appeal for U.S. Appl. No. 10/867,157 (Apr. 11, 2013).
First Office Action for Canadian Application No. 2,554,177 (Mar. 11, 2013).
Third Office Action for Canadian Application No. 2,528,648 (Jan. 22, 2013).
Second Office Action for Canadian Application No. 2,528,871 (Jan. 21, 2013).
First Office Action for Chinese Application No. 200980111437.X (Jan. 4, 2013).
Non-Final Official Action for U.S. Appl. No. 12/051,374 (Oct. 12, 2012).
First Office Action for Canadian Applicaton No. 2,554,176 (Aug. 27, 2012).
Advisory Action Before the Filing of an Appeal Brief for U.S. Appl. No. 12/051,374 (Oct. 31, 2013).

(56) References Cited

OTHER PUBLICATIONS

Non-Final Office Action for U.S. Appl. No. 12/646,542 (Oct. 25, 2013).
Notice of Allowance and Fee(s) Due for U.S. Appl. No. 10/867,159 (Aug. 20, 2013).
Final Office Action for U.S. Appl. No. 12/051,374 (Aug. 8, 2013).
Notice of Allowance and Fee(s) Due for U.S. Appl. No. 10/867,157 (Jul. 22, 2013).
Second Office Action for Canadian Application No. 2,554,177 (Jan. 10, 2014).
Extended European Search Report for European Application No. 09709156.5 (Dec. 5, 2013).
Notice of Allowance for Canadian Application No. 2,528,648 (Nov. 25, 2013).
Applicant-Initiated Interview Summary for U.S. Appl. No. 12/051,374 (Nov. 20, 2013).
Second Office Action for Canadian Application No. 2,554,176 (Nov. 12, 2013).
Second Office Action for Chinese Application No. 200980111437.X (Oct. 22, 2013).

\* cited by examiner

PCMM APPLICATION MANAGER

CROSS-REFERENCE TO RELATED APPLICATIONS

This application is a continuation of U.S. patent application Ser. No. 10/867,158 filed Jun. 14, 2004, which claims the benefit of U.S. Provisional Patent Application Ser. No. 60/477,970, filed Jun. 12, 2003; and U.S. Provisional Patent Application Ser. No. 60/547,208, filed Feb. 24, 2004, the entire contents of each which are incorporated herein by reference.

TECHNICAL FIELD

This invention relates generally to policy-based network resource management.

BACKGROUND

In general, a policy server manages network resources according to a set of rules, i.e., a policy. While some policy servers simply carve out network resources for undifferentiated data between network routing or switching elements (e.g., from router A to router B), an application-focused policy server manages network resources to fulfill the needs of applications. For example, in a Voice over Internet Protocol (VoIP) application, two network endpoints may wish to establish a VoIP call with one another via the network. The network endpoints request network resources from the policy server for the VoIP call.

FIG. 1 shows one way to implement this VoIP example. A first network endpoint 10 wishes to establish a VoIP call to a second network endpoint 12 via an access network 14. The first endpoint 10 specifies the session attributes in its session setup request to the application server. The application server 18 includes the VoIP application that is responsible for coordinating and setting up the session or call between the endpoints. The application server 18 relays the request for resources associated with the VoIP session to a policy server 20 using PacketCable Multimedia (PCMM) protocol (PKT-TR-MM-ARCH-V01-030627, V01, Jun. 27, 2003; and, PKT-SP-MM-101-030627, Jun. 27, 2003). The application server 18 is synonymous with an application manager 22 that provides the functionality necessary to reserve and manage QoS for the session via the policy server. The policy server in turns controls the network resources to ensure proper treatment is applied to all the media streams associated with the call or session.

Having the functionality of the application manager 22 located in the application server 18 complicates the design of the application server 18. Since some application servers do not need application managers, an application manager constitutes unnecessary cost and complexity for those installations.

SUMMARY OF THE INVENTION

In one aspect, a method of assigning a set of network resources between network endpoints using a session initiation request to an application manager for reserving resources between network endpoints. The application manager is logically and physically (or only logically) decoupled from an application server associated with the network endpoints. The method further includes providing a PCMM message from the application manager to a policy server as a result of the session initiation request, wherein the PCMM message includes at least some information embedded in the session initiation request. Suitable protocols other than PCMM may also be used to convey this information between the application manager and the policy server. The method further includes selecting, via the policy server, a set of network resources for creating a path connecting the network endpoints, wherein the policy server selects the set of network resources based on the PCMM message.

The session initiation request may be communicated via Session Initiation Protocol (SIP—see J. Rosenberg, et. al., "SIP: Session Initiation Protocol", RFC 3261, June 2002), using the Session Description Protocol (SDP—see Handley, M. and V. Jacobson, "SDP: Session Description Protocol", RFC 2327, April 1998) field in the SIP message to perform the necessary QoS reservation of resources in the network. The QoS information may be included in the session description protocol fields within the session initiation request. The application manager may be inserted between one of the network endpoints and an application server. The application manager transparently relays the session initiation request between the network endpoint and the application server, without requiring functional modifications of the network endpoints or the application server.

In one embodiment, the method combines high-level QoS information from the session initiation request, with understanding of underlying network technologies, to produce detailed QoS information for use in the PCMM message. In another embodiment, the method embeds QoS information either via SDP or via RSVP FlowSpecs (as defined in IETF documents Wroclawski, J., "The Use of RSVP with IETF Integrated Services", RFC 2210, September 1997. Wroclawski, J., "Specification of the Controlled-Load Network Element Service", RFC 2211, September 1997. Shenker, S., Partridge, C., Guerin, R., "Specification of Guaranteed Quality of Service", RFC 2212, September 1997) in an eXtensible Markup Language message (XML), and uses the XML message to communicate the session initiation request to an application server, which subsequently transfers the QoS information to the application manager in an XML message. The method may alternatively use HTTP to communicate the XML message to an application server, which subsequently transfers the QoS information to the applications manager.

In one embodiment, the application server remains stateless through the use of a unique session identifier for communicating with the application manager, and the association between the session and the resources are maintained in the decoupled application manager. The session identifier is constructed from the SIP signaling messages between the end points and the application server.

In one embodiment, the method includes selecting RSVP FlowSpec parameters based on SDP media attributes, and providing the ability to configure FlowSpec parameter selection behavior for the purposes of performing resource reservation in a PCMM framework. The method further includes ensuring interoperability with DOCSIS Service Flow QoS parameters at the CMTS for providing QoS by normalizing the selected FlowSpec parameters across different CMTS vendor implementations. The method also includes ensuring interoperability between network endpoints that implement different optional features of SDP media attributes.

In one embodiment, the method includes providing configurable settings per direction (upstream and downstream), using these setting in FlowSpec parameter selection, along with the default values for each setting. The configurable settings and associated default values include:
Delay, 100 milliseconds (downstream and upstream)
BandwidthAdjust, 1.125 (downstream)

BandwidthAdjust, 1.0 (upstream)
RateFactor, 4.0 (downstream and upstream)
MinPacketSize, 640 (downstream and upstream)
MaxPacketSize, 1500 (downstream and upstream)
SlackTerm, 800 (downstream and upstream)
RateLimit, 96000 (upstream)
RateLimit, 0 (downstream)
PollIntervalLimit, 6000 microseconds (upstream)
PollIntervalSet, empty (upstream)

When the "ptime" media attribute (packetization time) is not given in the SDP, the method includes selecting RSVP FlowSpec parameters such that sufficient resources are reserved for all packetization times mandated by the Packet-Cable Audio/Video Codecs Specification.

When multiple codecs are negotiated in the SDP fields, the method includes selecting RSVP FlowSpec parameters such that sufficient resources are reserved for all packetization times mandated by the PacketCable Audio/Video Codecs Specification.

In one embodiment, the method includes using the DOCSIS QoS MIB to accurately determine ptime (packetization time) when a ptime media attribute is unknown, and modifying reserved resources if the ptime media attribute is subsequently determined. In another embodiment, the method includes using the DOCSIS QoS MIB to accurately determine ptime (packetization time) when negotiating multiple codecs to determine a particular codec being used, and modifying reserved resources if the particular codec is subsequently determined.

In one embodiment, the application manager learns the contact IP address and port number of one or both endpoints from the REGISTER messages so that the application manager can forward INVITE messages to the endpoint. In another embodiment, the application manager queries the application server to obtain the contact IP address and port number of one or both endpoints so that the application manager can forward INVITE messages to the endpoint.

In another aspect, a system for assigning a set of network resources between network endpoints includes an application manager for (i) receiving a session initiation request for initiating communication between the network endpoints through the set of network resources, and (ii) generating a PCMM message including at least some information embedded in the session initiation request. The communication between the network endpoints employs an application residing on an application server. The system further includes a policy server for receiving the PCMM message, and for selecting the set of network resources for creating a path connecting the network endpoints, wherein the policy server selects the network resources based on the PCMM message.

DETAILED DESCRIPTION

The described embodiment is a network architecture that uses an application server, an application manager, and a policy server to implement application-specific policies for network resource allocation. This embodiment abstracts the application manager away from the application server, so that the application server does not have to implement complex network specific signaling interfaces such as PCMM in order to perform admission control or resource requests over the network. This embodiment describes two endpoints implementing a high quality video teleconference session, although these concepts can apply also to other applications, such as video streaming, Voice over Internet Protocol (VoIP) communications, and networked gaming. The abstraction of the application manager from the application server mandates a new signaling interface between the application manager and the application server. This interface is now a much simpler interface than PCMM, and can use either SIP signaling, or another protocol such as eXtensible Markup Language (XML), Real Time Streaming Protocol (RTSP) or HyperText Transfer Protocol (HTTP) to communicate between the application server and the application manager. The now abstracted application manager can interpret the much simpler 'language' and translate it into the more complex and network specific language in order to communicate with the Policy Server for reserving and managing network resources.

The CableLabs PacketCable Multimedia (PCMM) protocol specification (PKT-TR-MM-ARCH-V01-030627, V01, Jun. 27, 2003), defines an application manager function embedded in an application server. The application manager function is responsible for communicating with the policy server to implement policy decisions, e.g., admission control and Quality of Service (QoS), through a PCMM signaling interface. By abstracting the application manager from the applications themselves (i.e., away from the application server), this embodiment relieves the application server from needing to know about the PCMM architecture and its associated protocols. In this embodiment, the application server can therefore interface to the PCMM environment in a much more generic way (i.e., via the abstracted applications manager), while delegating the task of maintaining state (regarding gate tokens) to the application manager. Now, the application manager can either be standalone, or be embedded in the Policy Server; this is an optimization to minimize the number of network elements involved in the delivery of the service.

Figure 1:
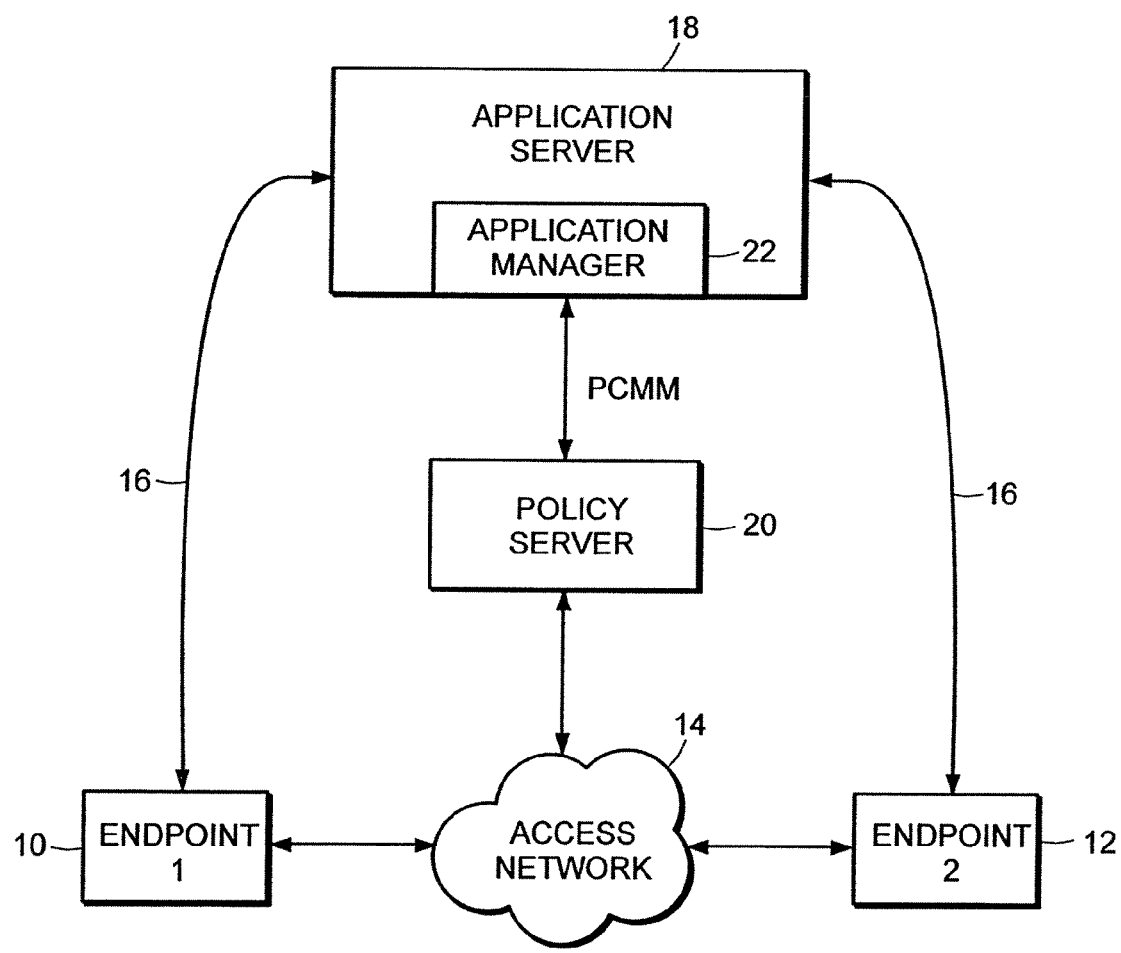
FIG. 1 shows a prior art architecture for establishing a VoIP link between two network endpoints; and, FIG. 2 shows the network architecture of the described embodiment.
Figure 2:
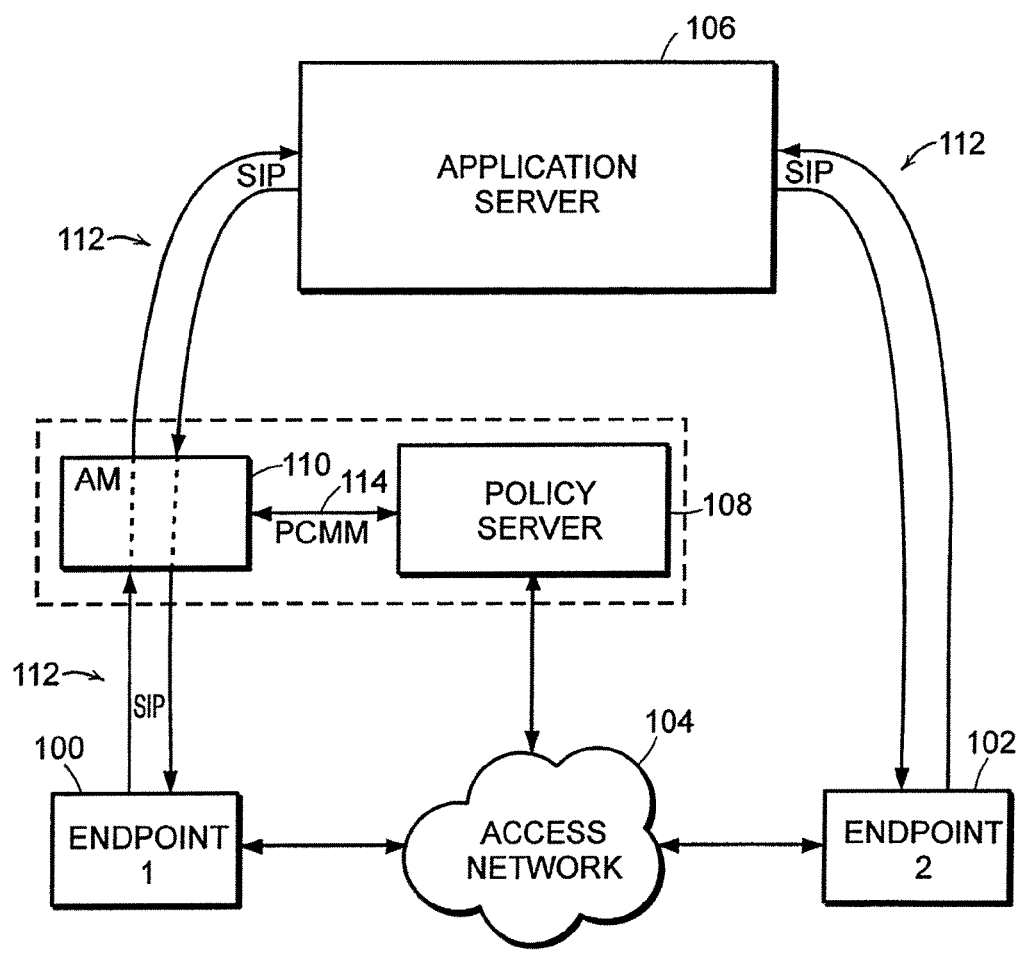

FIG. 2 shows one particular embodiment of the network architecture, including a first network endpoint 100, a second network endpoint 102, an access network 104, an application server 106, a policy server 108 and an application manager 110. This embodiment has a broken-line box around the policy server 108 and the application manager 110 to show that the functionality of both of these components resides on the same physical platform, although as we will describe later, the application manager 110 can reside on a physical platform separate from the policy server 108 (i.e., in a standalone configuration). In this embodiment, the first network endpoint 102 uses a SIP exchange to request a video teleconference session through the access network 106 to the second network endpoint 104. This video teleconference session uses a video teleconference application residing on the application server 106.

The application manager 110 sits in the SIP signaling path 112. Although the SIP connections 112 between the endpoints 100, 102 and the application server 106 are shown in FIG. 2 as direct connections for simplicity, it should be understood that all connections from the endpoints pass through the access network 104.

Every SIP session begins with a three-way handshake between two SIP endpoints. The endpoint that is initiating the session (the "caller") first sends an INVITE message to the receiving endpoint (the "callee"). The callee responds with an OK message back to the caller. The caller then responds with an ACK message. In FIG. 2, the two SIP endpoints are the first network endpoint 100 and the second network endpoint 102, where the first network endpoint 100 is the caller, and the second network endpoint 102 is the callee. The application server 106 functions in this embodiment as a SIP proxy server, receiving and forwarding SIP messages from and two the endpoints 100 and 102.

While the application manager 110 sits in the SIP signaling path, the application manager 110 transparently passes the SIP handshake exchanges, so that the SIP endpoints or the proxy server (application manager 106) do not perceive the application manager 110 in the SIP signaling path. As the application manager 110 passes the first SIP INVITE message from the first network endpoint 100 to the application server 106, the application manager 110 extracts the Session Description Protocol (SDP) fields from the INVITE message for information about the first network endpoint 100. When the application manager 110 receives the OK message from the application server 106, the application manager extracts the SDP fields from the OK message for information about the application server. Before forwarding the OK message to the first network endpoint 100, the application manager 110 determines whether to dynamically create Quality of Service (QoS) for only the first network endpoint 100 or for both the first network endpoint 100 and the second network endpoint 102. Based on this determination, the application manager sends Gate Set messages via the PCMM link 114 to the policy server 108. Details regarding how the application manager translates the SDP field in the SIP exchanges into parameters for the Set Gate messages are described later for both voice and video communications.

For every media type listed in the SDP, the application manager 110 creates two gates on the policy server: one in the "upstream" direction, and one in the "downstream" direction. Thus, for the video teleconference session in this embodiment, the application manager 110 creates four gates per endpoint. One gate is for upstream audio, one gate for upstream video, one gate for downstream audio, and one gate for downstream video.

The application manager 110 determines whether to create QoS by examining at the Via header in the INVITE and OK messages. Based on the number of entries in the Via header, the application manager 110 can determine whether the first network endpoint 100 and the second network endpoint 102 are both using the same applications manager as the first hop. In a multiple-domain environment, it is possible that the caller is using one application manager as its first hop, and the callee is using another application manager as its first hop. In such a multiple-domain case, each application manager is only responsible for creating QoS for the network endpoint that uses that application manager for its first hop. To relate INVITE messages and OK messages to corresponding PCMM messages and related gates, the application manager uses the CallID header in the SIP messages. Using this technique, a decoupled application manager can transparently exist in a network requiring no modifications to the endpoints or to the application server functionality (i.e., no changes to the actual design or functional implementation of these components).

Once the application manager 110 has set up a dialog between the endpoints, and the QoS is established for the endpoints, one of the endpoints may send another INVITE message altering its QoS requirements. The application manager 110 handles such re-INVITE messages by altering the gates created earlier for that dialog.

When the dialog has to be torn down, the endpoint initiating the tear down sends a BYE message. After passing along the BYE message, the application manager 110 clears the QoS that it created for that dialog by sending PCMM Gate Delete messages to the Policy Server 108. The application manager 110 maintains a database for storing information regarding which gates were created for a dialog, so the application manager can identify which gates need to be deleted when the dialog is being torn down.

Figure 3:
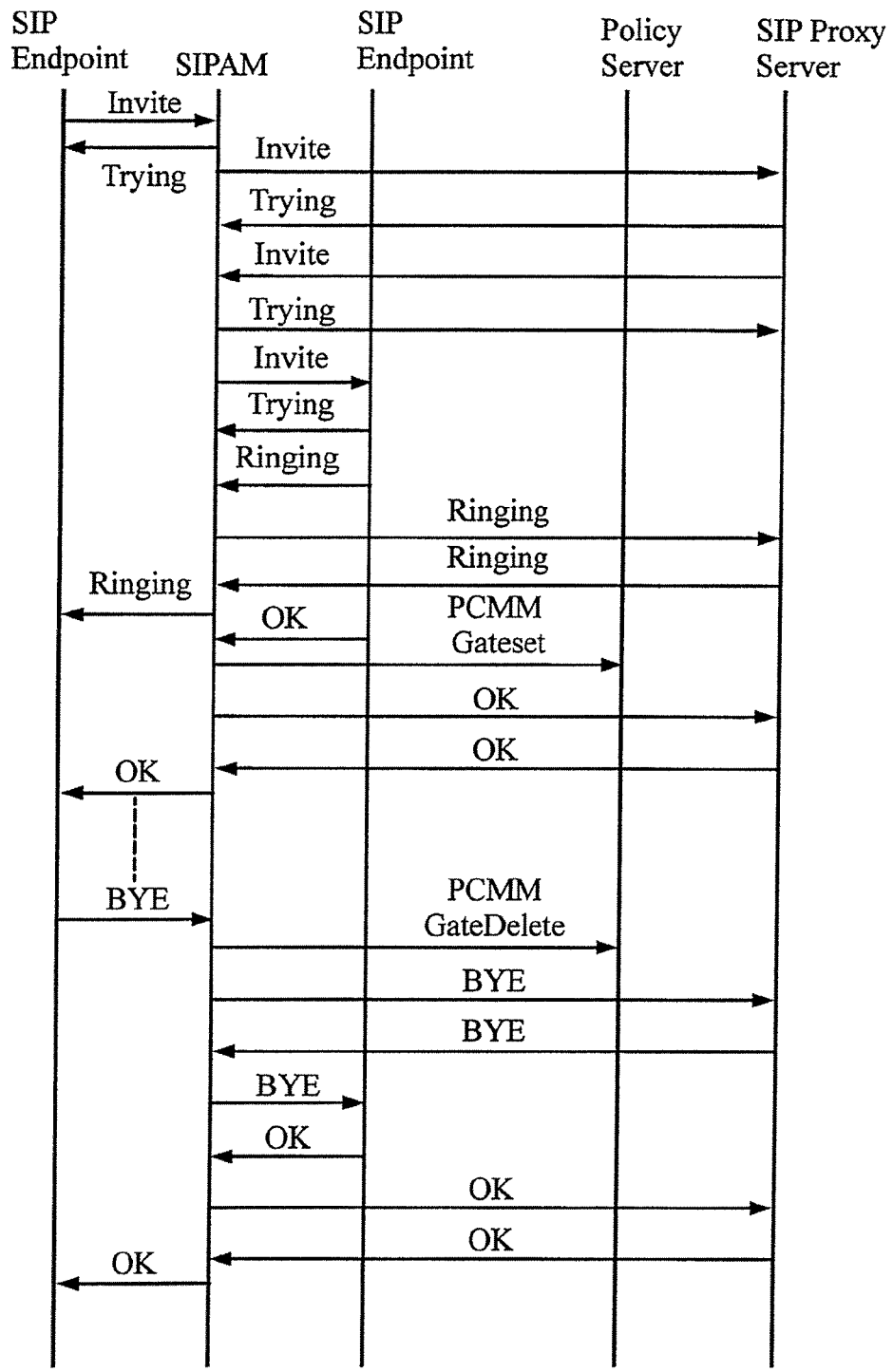
FIG. 3 shows a sample call flow for two network endpoints in the same network domain.
Figure 4:
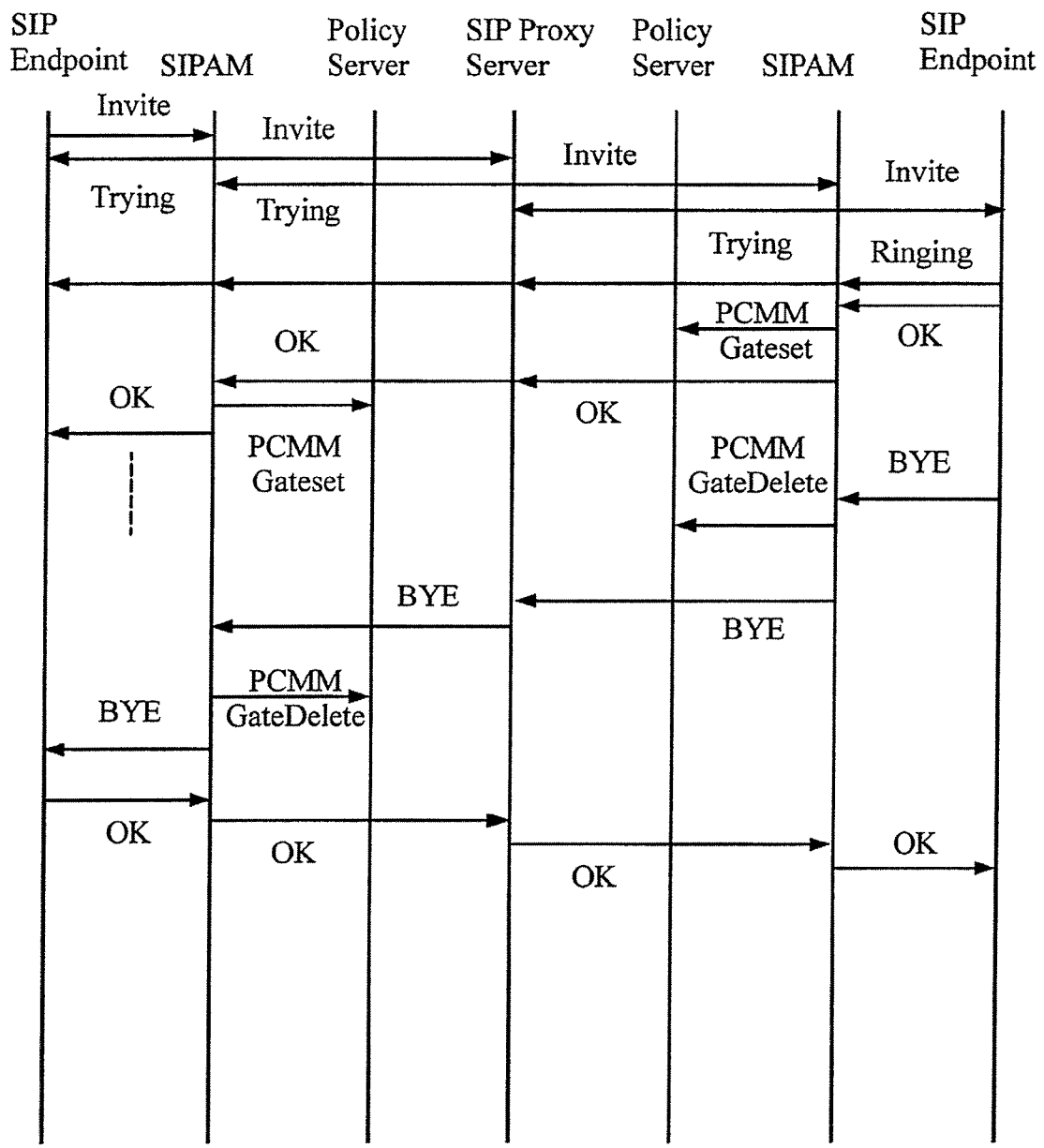
FIG. 4 shows a sample call flow for two network endpoints in different network domains.

FIG. 3 shows a sample call flow for two network endpoints in the same network domain, and FIG. 4 shows a sample call flow for two network endpoints in different network domains. The call flow for each figure includes the flow of SIP signals and PCMM messages between endpoints in two domains. For FIG. 4, each domain has its own application manager 110 and policy server 108, but a central proxy server connects the two domains.

In another embodiment, the application manager requests QoS via a two-phased approach. When the application manager receives an INVITE message from the caller, the application manager will not only learn the caller's requirements, but also send GateSet messages to the policy server. These GateSet messages will only "reserve" the QoS for the caller and/or the callee, i.e., it does not yet "commit" the necessary gates. As the call setup progresses and the application manager receives the corresponding OK message from the callee, the application manager sends a Gate Set messages for the callee (if needed) and also send Gate Set messages for the caller. This time the application manager "commits" the caller and callee's gates, rather than only reserving them.

This embodiment provides better control of the gates on the policy server. In other words, by first "reserving" gates, the application manager does not consume valuable resources on the PEP (policy enforcement point). The application manager only commits these resources when the application manager receives the OK, at which point the application manager knows that the callee is available for completing the session establishment.

In another embodiment, the application manager learns contact information from REGISTER messages coming from endpoints. This feature allows the application manager to learn the IP address and port number of the endpoints for the purposes of forwarding an INVITE message to an endpoint. In cases where the Registration server cannot handle multiple hops between the endpoint and itself, the Registration server will only forward INVITE messages to the application manager. The application manager then uses this information to deliver the INVITE to the correct endpoint.

In another embodiment, the application manager obtains contact information from the application server by querying it with a REGISTER message containing an empty Contact header. This feature allows the application manager to learn the IP address and port number of the endpoints for the purposes of forwarding an INVITE message to an endpoint. In cases where the Registration server cannot handle multiple hops between the endpoint and itself, the Registration server will only forward INVITE messages to the application manager. The application manager then queries the application server to obtain the contact information and deliver the INVITE to the correct endpoint.

Although the described embodiment performs session initiation between the endpoint and the application server is SIP, other even simpler and more flexible protocols can also be used for communication between the endpoint and the application server. For example, one embodiment uses eXtensible Markup Language (XML) instead of SIP for an endpoint to communicate session setup embedded with QoS information to the application server. Other embodiments use Real Time Streaming Protocol (RTSP) or HyperText Transfer Protocol (HTTP) for session initiation and resource requests. The QoS information can be in embedded or in the format of SDP or IETF RSVP FlowSpec Although the described embodiment performs session initiation with SIP, and the interface between the application server and the application manager is also SIP, other even simpler protocols can also be used for communication between the application server and the application manager. For example, one embodiment uses eXtensible Markup Language (XML) for a application server to communicate resource requests to the application manager. Other embodiments use Real Time Streaming Protocol (RTSP) or HyperText Transfer Protocol (HTTP) for session initiation and resource requests. The QoS information can be in embedded or in the format of SDP or IETF RSVP FlowSpec (as defined in IETF documents Wroclawski, 3., "The Use of RSVP with IETF Integrated Services", RFC 2210, September 1997. Wroclawski, J., "Specification of the Controlled-Load Network Element Service", RFC 2211, September 1997. Shenker, S., Partridge, C., Guerin, R., "Specification of Guaranteed Quality of Service", RFC 2212, September 1997)

When using XML, the application server inserts the SDP field into the XML message sent to the application manager. This application server extracts the SDP field out of the SIP messages used to communicate with the end points, and puts it in a XML message and sends it to the application manager, which then performs the necessary translations to appropriate PCMM messages. In addition, the application server communicates to the application manager the context for the session, through a unique session identifier. This session identifier can be constructed from the SIP signaling messages between the end points and the application server. Because the application server only needs to communicate with the application manager as a result of messaging activity between the end points and the application server, the application server can construct the session ID during this process to issue messages to the application manager. This enables the application server to remain "stateless." The application server does not have to keep state of the application session and the resource mapping, thus simplifying the implementation and functionality of an application server. When resources need to be relinquished, the Application server uses the session identifier constructed from the SIP signaling messages to communicate to the application manager. The application manager maintains state of the session and the resource association, and thus is "stateful."

As with the described embodiment, the application manager may be embedded in the policy server, or it may be resident on a stand-alone platform. In either case, the application manager transforms the QoS information in the SDP into more detailed QoS by combining the SDP with knowledge of the access network, and forwards the more detailed QoS information to the policy server via a PCMM message.

Video SDP Translation

The paragraphs that follow describe the details of translation from SDP fields to PCMM data for digital video traffic. The PCMM architecture uses the IETF's RSVP FlowSpec parameters to communicate Quality of Service (QoS) requirements between the Policy Server and the Cable Modem Termination System (CMTS). The following paragraphs describe some ways to select FlowSpec parameters appropriately for use in PCMM for the purposes of enabling high quality video teleconference sessions for SIP User Agents (i.e., network endpoints) based on SDP parameters.

Three challenges in selecting FlowSpec parameters include:

1. The SDP specifications continue to evolve and many parameters (e.g., media attributes) are not well established; most are optional. There exist SIP/SDP implementations that do not include all the optional media attributes that would result in optimal FlowSpec parameter selection.
2. Compressed digital video traffic is Variable Bit Rate (VBR), meaning packets vary in size and arrive at random intervals.
3. QoS as specified by DOCSIS and provided by the CMTS has many optional and CMTS implementation-dependent features. (DOCSIS refers to the set of Data-Over-Cable Service Interface Specifications, which defines how to transmit data over cable networks in a standard fashion. For example, DOCSIS RFI MAC protocol defines how to connect to cable modems over the access network RFI is the DOCSIS Radio Frequency Interface specification defining MAC and Physical Layer interfaces between CMTS and CM network elements. This means that while one CMTS vendor may decide to implement a particular feature, another may not, or may decide to implement it differently. Interoperability issues between CMTS, Cable Modem, and other equipment further complicate the process of selecting optimal parameters to ensure QoS.

The following paragraphs set forth how the described embodiment overcomes these challenges.

VBR Video Traffic Characteristics—

Providing QoS for the transmission of real-time video over digital networks is particularly difficult because of the VBR nature of compressed digital video traffic. Video compression codecs (e.g., MPEG, H.263, H.261) use temporal compression techniques, in which the compression ratio changes from frame to frame and is dependent on the change or movement across subsequent frames from a periodic snapshot of the scene. This leads to high peak burst rates and generally high but variable peak-to-mean ratios. These characteristics make it more difficult to efficiently estimate resource utilization and make accurate reservations than for constant bit rate traffic such as voice.

Without an accurate estimate of required resource reservations, either too many resources are reserved, leading to low utilization and a high cost of service, or not enough resources are reserved, leading to higher loss and higher delay. Either case results in poor quality of service. Providing high quality multimedia services at the lowest cost possible requires an efficient and accurate method to predict resources required for video transmission on a per-session basis.

DOCSIS Service Flow QoS Parameters—

The following few paragraphs describe DOCSIS QoS parameters and their relationship to the IETF's FlowSpec parameters for transmission of digital video. The FlowSpec to DOCSIS parameter mapping is specified in the PacketCable Multimedia Specification (PKT-SP-MM-101-030627, Jun. 27, 2003). The DOCSIS Service Flow QoS Parameters applicable for video transmission utilize the DOCSIS Real-Time Polling Service (rtPS) in the Upstream combined with Minimum Reserved Rate and Maximum Sustained Rate in both the Upstream and Downstream. The Real-Time Polling Service works well for bursty VBR traffic such as digital video because it provides a cable modem with contention-free, timely request opportunities without the need to allocate upstream bandwidth until the modem (also referred to herein as the network endpoint) has data to send.

The first two QoS parameters, Nominal Polling Interval and Tolerate Polling Jitter, are only used in the upstream. The last parameter, Maximum Downstream Latency, is only used in the downstream. The remaining parameters are used in both the upstream and downstream.

Nominal Polling Interval—

The DOCSIS Nominal Polling Interval specifies the time interval, in microseconds, in which the cable modem will receive periodic unicast (contention free) request opportunities. For VBR video traffic, it is important that the Nominal Polling Interval be short enough that the modem receives request opportunities and subsequent grants often, enabling it to transmit at its peak rate during burst periods. The only way to ensure the modem enough request opportunities during peak bursts is to set the polling interval as if a flow were sending traffic at its peak rate continuously. If the polling interval only allows for the average rate, packets will be dropped or delayed during the burst period.

For example, consider a video source with average rate of 256 Kbps (32000 bytes/second) and average packet size of 640 bytes (50 packets per second on average). Also consider that during burst periods, it will peak at a rate of 768 Kbps (150 packets per second). If the modem were only allowed 50 request opportunities per second, during burst periods it wouldn't receive request opportunities fast enough, and packet loss will occur. In order to minimize packet loss during peak bursts, the modem must receive 150 request opportunities per second.

It is true that during non-burst periods, where the Service Flow is sending data at a lower rate, the unused request opportunities will be wasted. However, the amount of resources used to schedule and transmit a request opportunity downstream by the CMTS is insignificant to the amount of data being transmitted upstream, as well as the amount of time required for the modem to use a contention request (because of exponential back-off and the possibility for collision). The DOCSIS Real-Time Polling Service was designed with this in mind, which is why it is ideal for bursty VBR real-time traffic such as video.

Because the Polling Interval is derived from the RSpec's Reserved Rate R for rtPS, the Reserved Rate R will typically be set equal to Peak Rate p, and both R and p will be greater than the Bucket Rate r. This is consistent with the IETF usage of these parameters for Guaranteed Service.

Tolerated Polling Jitter—

The DOCSIS Tolerated Polling Jitter parameter specifies the amount of time, in microseconds, a unicast request opportunity for Real-Time Polling may be delayed. For real-time video sessions, this value should be relatively small. PCMM specifies a default of 800 microseconds and is conveyed to the CMTS via the IETF RSpec Slack Term S parameter.

Maximum Sustained Traffic Rate—

The DOCSIS Maximum Sustained Traffic Rate parameter specifies the maximum sustainable rate over time (i.e., the average rate) in bits per second of DOCSIS MAC layer datagrams, and includes all MAC layer header and CRC overhead. In DOCSIS, the upstream overhead is slightly larger due to extended headers in the upstream. For VBR video traffic, this should be equal to the video's maximum sustainable rate after accounting for MAC layer overhead.

Maximum Traffic Burst—

The DOCSIS Maximum Traffic Burst parameter specifies the largest burst size in MAC layer bytes, the flow may transmit at its peak rate. For VBR video traffic, it is important that the Maximum Traffic Burst is set high enough to allow the flow to burst at its peak rate. The Maximum Traffic Burst is set equal to the IETF Token Bucket Depth b after accounting for MAC layer overhead. There is the additional requirement that the Traffic Burst must not be less than the DOCSIS specified minimum value of 1522 bytes.

Minimum Reserved Traffic Rate—

The DOCSIS Minimum Reserved Traffic Rate specifies a guaranteed minimum rate the flow will receive and closely resembles the IETF RSpec Reserved Rate R after accounting for MAC layer overhead. However, for the purposes of PCMM, the conversion from RSVP FlowSpec to DOCSIS specifies the use of the TSpec Bucket Rate r parameter. This conversion works well for VBR video traffic, because the RSpec Reserved Rate R is typically the same as (or greater than) the TSpec Bucket Rate r. That is to say, at the DOCSIS MAC layer, the reservation is made using the average rate of the video session. Test results show that setting the Minimum Reserved Traffic Rate using the bandwidth as advertised in the SDP media attributes works well in the upstream, however the downstream experiences enough packet loss to significantly affect the video quality at some bit rates. The described embodiment provides for a small, selectable percentage increase in the bandwidth to overcome this packet loss.

Assumed Minimum Reserved Rate Packet Size—

The DOCSIS Assumed Minimum Reserved Rate Packet Size, closely resembles the IETF TSpec Minimum Policed Unit m. Like the IETF parameter it is used to estimate per packet overhead. If the Service Flows sends packets smaller than this size, the packets will count as being of this size for the purposes of maintaining the reserved rate. For VBR video traffic where there is a large variance of packet size, our implementation will use a configured fixed packet size parameter. Note that although DOCSIS specifies this parameter for both upstream and downstream Service Flows, PCMM only specifies it for downstream. The DOCSIS default for this parameter is not defined, and is CMTS-implementation dependent.

Maximum Downstream Latency—

The DOCSIS Maximum Downstream Latency parameter specifies the maximum latency (in microseconds) a packet may experience between being received at the CMTS Network Interface and being transmitted downstream on the HFC. This parameter only applies to flows that have a downstream Minimum Reserved Rate configured and the flow is not exceeding this rate. For PCMM, this parameter is set from the RSpec Slack Term S.

Mapping SDP Video Bandwidth to RSVP FlowSpec—

If the SDP does not include a bandwidth media attribute parameter, all FlowSpec parameters are selected using pre-configured defaults. Otherwise, the application manager 110 uses the SDP bandwidth media attribute as input to map SDP to FlowSpec parameters. Other settings that affect the selection of RSVP FlowSpec parameters are configured and described in this section. In general, most of the following parameters the application manager uses are configured for each direction (i.e., upstream and downstream).

Delay (Milliseconds)—

This is the maximum worst-case queuing delay for video, and corresponds to the maximum burst size (the amount of time a flow may burst at its peak rate). An initial default value of 100 milliseconds is suggested.

BandwidthAdjust (Floating Point Multiplier)—

This is a "fudge factor" used to multiply original SDP requested bandwidth to reserve more bandwidth for clients that underestimate video bandwidth or to solve other interoperability issues. An initial default value of 1.0 is suggested for upstream and 1.125 for downstream. During initial testing it was observed that at all rates below 512 Kbps, additional bandwidth was required in the downstream for video quality to be acceptable, due mostly to excessive packet loss and delayed packets RateFactor (Floating Point Multiplier)—

This is used to compute peak and reserved rate given a maximum sustained throughput (bandwidth). An initial default value for RateFactor is 4.0.

MinPacketSize (Bytes)—

This is the estimated IP packet size used for minimum policed unit and other calculations requiring packet size. An initial (conservative) default value for MinPacketSize is 640.

MaxPacketSize (Bytes)—

This is the maximum IP packet size expected to conform to the IETF TSpec. An initial default value for MaxPacketSize is 1500.

SlackTerm (Microseconds)—

This is the value used for IETF RSpec Slack Term S. For PCMM it corresponds to the DOCSIS Upstream Tolerated Polling Jitter in the upstream and the DOCSIS Downstream Latency in the downstream. An initial default value for Slack-Term is 800 microseconds, which is the default in PCMM.

RateLimit (Bytes Per Second)—

This is the upper limit on the Reserved Rate R and Peak Rate p, parameters specified in bytes per second. An initial default value for RateLimit is 96000 for the upstream, and 0 for the downstream (a value of 0 means there is no limit).

The following parameters are specified for upstream only.

PollIntervalLimit (Microseconds)—

This is the minimum polling interval to request from the CMTS. An initial default value for PollIntervalLimit is 6000 microseconds (a value of 0 means there is no limit).

PollIntervalSet is a list of acceptable polling intervals at the CMTS. See description below. The suggested initial default set is empty.

The following are relevant TSpec Parameters from the PCMM specification.

Bucket Depth (b)—

The TSpec Token Bucket Depth combined with the TSpec Token Bucket Rate bounds the maximum burst size (at the peak rate) of a flow, as well as the maximum worst case queuing delay the flow will experience. As such, both the maximum worst case queuing delay and the peak rate of the flow must be considered.

The TSpec Bucket Depth b in bytes is given by:

$$b = (\text{Delay} * p)/1000$$

where Delay is the configured maximum queuing delay in milliseconds, and p is the TSpec Peak Rate in bytes per second.

Example:
Delay=100 msec
p=32000
b=(100*32000)/1000=3200

Bucket Rate (r)—

The TSpec Token Bucket Rate specifies the average rate over time to which the IP flow will conform. The TSpec Bucket Rate r in bytes per second is:

$$r = (\text{Bandwidth} * \text{BandwidthAdjust})/8$$

where Bandwidth is the advertised bandwidth from the SDP in bits per second, and BandwidthAdjust is the configured adjustment multiplier.

Example:
Bandwidth=512000
BandwidthAdjust=1.0
r=512000*1.0/8=64000

Maximum Datagram Size (M)—

The TSpec Maximum Datagram Size M in bytes is set to the configured MaxPacketSize.

Minimum Policed Unit (m)—

The TSpec Minimum Policed Unit m in bytes is set to the configured MinPacketSize.

Peak Rate (p)—

The TSpec Peak Rate is the maximum rate the flow is expected to burst data onto the network. The TSpec Peak Rate p in bytes per second is always equal to RSpec Reserved Rate. This statement is an indirect result of using Reserved Rate R for the DOCSIS rtPS polling interval. The Polling Interval must be set using the Peak Rate, which effectively means the Peak Rate must be equal to the Reserved Rate.

The following are relevant RSpec Parameters from in the PCMM specification.

Reserved Rate (R)—

The RSpec Reserved Rate is the guaranteed rate the flow is entitled to, provided that its traffic conforms to the TSpec. In PCMM, the Reserved Rate is used to determine the DOCSIS Nominal Polling Interval. In the described embodiment, the derivation of the Reserved Rate is controlled by configured limits. This is necessary to solve interoperability issues between the CMTS and the Policy Server/application manager. Specifically, hard limits on the maximum value for the Reserved Rate R parameter (RateLimit), as well a limit on the derived DOCSIS Upstream Nominal Polling Interval (PollIntervalLimit) are configured.

RSpec Reserved Rate R in bytes per second is:
R=r*RateFactor RateLimit=0
R=min(r*RateFactor, RateLimit) RateLimit>0 where r is the TSpec Token Bucket Rate, RateFactor is the configured rate multiplier, and RateLimit is the configured upper limit on the Reserved Rate parameter. If RateLimit is zero, then there is no upper limit on the Reserved Rate.

In the upstream there are two ways to configure the Nominal Polling Interval, which is derived from the Reserved Rate: either setting a limit on the Polling Interval using PollIntervalLimit setting, or only allowing Polling Intervals in a predetermined set of intervals by configuring PollIntervalSet. The PollIntervalSet is a list of acceptable Nominal Polling Intervals supported at the CMTS. If this list is non-empty, then the second method will be used, otherwise the first method is used.

First Method: Using PollIntervalLimit—

In the upstream, there is the additional requirement that the Minimum Policed Unit m (bytes) divided by the Reserved Rate R (bytes/second) MUST NOT be less than the configured PollIntervalLimit (microseconds). That is to say, the following inequality must always hold true when the configured PollIntervalLimit>0:

$$m/R * 10^6 \geq \text{PollIntervaLimit}$$

For the Upstream, Reserved Rate R in bytes per second is:
R=same as equations above for R PollIntervalLimit=0
R=min(r*RateFactor, m*10⁶/PollIntervalLimit) PollIntervalLimit>0

Example (limits on Rate and Polling Interval):

$$r = 64000$$

$$m = 640$$

$$\text{RateFactor} = 4.0$$

$$\text{RateLimit} = 96000$$

-continued $$PollIntervalLimit = 10000$$

$$R = \min(64000 * 4.0, 96000) \, PollIntervalLimit = 0$$
$$= \min(256000, 96000)$$
$$R = \min(96000, 640 * 10^6 / 10000) \, PollIntervalLimit > 0 = 10000$$
$$= \min(96000, 80000)$$
$$= 80000$$

Second Method: Using PollIntervalSet—

When the PollIntervalSet is non-empty, the derived Nominal Polling Interval must be selected from the set of configured values in microseconds. When using this method, the setting, RateLimit and PollIntervalLimit have no meaning.

Algorithm to choose R:
1. Compute the possible values of R ($R_1 \ldots R_n$) based on m and the set of configured polling intervals, $I_1$-$I_n$.
   In general, $R=(m*10^6)/\text{NominalPollingInterval}$
   $R_i=(m*10^6)/I_i$ for all i [1 . . . n]
2. Select one of the values for R above ($R_1 \ldots R_n$) that is closest to, but not greater than r*RateFactor.

Example (PollIntervalSet):
r=12000
m=640
RateFactor=4.0
PollIntervalSet={10000, 20000, 30000}
$R_1=(640*10^6)/10000=64000$
$R_2=(640*10^6)/20000=32000$
$R_3=(640*10^6)/30000=21333.3333 \ldots$
r*RateFactor=48000
R=32000

Slack Term (S)—

The Slack Term S in microseconds is set from the configured SlackTerm parameter.

Audio SDP Translation

The paragraphs that follow describe the details of translation from SDP fields to PCMM data for digital audio traffic. This description supplements the description for video traffic. The audio codecs at the network endpoints, as well as the inter-packet arrival time, determine the FlowSpec parameters for audio data. The PacketCable Codec Specification specifies three inter-packet arrival times (10, 20, 30 milliseconds). The PCMM Audio/Video Codecs Specification (PKT-SP-CODEC-I05-040113) also specifies each of the FlowSpec parameters for all audio codecs in the specification for each of the three packet times. The supported audio codecs include:
G.729E
G.729A
G.728
G.726.40
G.726.32
G.726.24
G.726.16
G.711 (PCM encoding) a-Law
G.711 (PCM encoding) μ-Law When a network endpoint in a SIP exchange specifies an audio codec using the SDP (Session Description Protocol), it should also use the optional "p-time" packetization time media attribute.

Two issues exist with respect to determining the correct FlowSpec parameters to use for audio codecs by SIP/SDP sessions. The first issue is that the packet time (i.e., "p-time") SDP media attribute is optional, and is therefore not used by all network endpoints. When the packet time is not known, the system can select FlowSpec parameters that will work at all three packet times: 10, 20 or 30 milliseconds. This method will always work, but will not always provide the efficient resource reservation. The smallest packet interval, combined with the largest packet size is used to accommodate all combinations of packet size and packet rate. When the packet time is not known, the system can also use a configured default packet time. The PacketCable default packet time is specified at 20 milliseconds. This or any configured default may be used when the behavior of the network endpoints in use are known.

The second issue with respect to determining the correct FlowSpec parameters is that there is no way to know, in general, which codec a SIP network endpoint will use when multiple codecs are available.

When a SIP network endpoint has multiple audio codecs available for use, and includes multiple codecs for the same media type (in this case, audio), it may use any of the available codecs negotiated between two network endpoints. Either endpoint must be prepared to receive any of the negotiated codecs, and there is no signaling to let the other end point know which codec is being used until the RTP (Real Time Protocol) media stream starts.

The described embodiment uses a combination of the following three techniques for determining which of multiple specified codecs on which to base resource reservation decisions.

First Technique—

When the SDP field specifies multiple codecs for the same media type, the application manager initially bases resource reservation decisions on the codec utilizing the greatest amount of network resources. This ensures that enough resources have been reserved so that any of the negotiated codecs will work properly.

Second Technique—

This technique uses the codec ordering in the SDP for each media type to select a particular codec. The SDP specification states that the order of the codecs in the SDP should determine the codec preference of the network endpoint. In most cases the first codec in the list will be the one used by the network endpoint. When network endpoints are known to adhere to this standard, this configuration will result in a more stringent QoS reservation, resulting in a lower cost of service.

Third Technique—

This technique uses the DOCSIS QoS MIB (Patrick, M., Murwin, W., "Data Over Cable System Interface Specification Quality of Service Management Information Base (DOCSIS-QOS MIB)", Internet-Draft (expires April 2004), http://www.ietf.org/internet-drafts/draft-ietf-ipcdn-qos-mib-09.txt, Oct. 27, 2003) at the CMTS to determine the audio packet size that the network endpoints are sending. Since audio traffic is CBR (Constant Bit Rate), the same packet size will be used for all packets. Examining the DOCS-QOS MIB will reveal the number of packets and bytes forwarded by the DOCSIS Service Flows used to carry the audio data, as well as the amount of time the flow is active. Dividing the total number of bytes by number of packets used to send those bytes yields the packet size. The rate is determined by dividing the total number of bytes forwarded by the amount of time that the flow is active.

The described embodiment makes an initial resource reservation using either the first technique or the second technique. After a few seconds of data transfer, the application manager determines the exact packet size and rate, and adjusts the resource reservation using the third technique, to more accurately represent what the audio codec requires. If dynamic codec switching is a known possibility, the described embodiment uses only the first technique, which will always work for any of the available codecs.

Other aspects, modifications, and embodiments are within the scope of the claims.

What is claimed is:

1. A method of allocating network assets for communication between first network endpoint and a second network endpoint, said method comprising:
   sending a session initiation invite to an application server for initiating a call flow between the network endpoints through the set of network assets, wherein the call flow is implemented by an application residing on an application server;
   in response to receiving the session initiation invite, sending a resource reservation message from the application server to an application manager, wherein the resource reservation message is provided to the application manager via a first interface of the application manager that employs a web services interface protocol, wherein the web services interface protocol is not a PacketCable multimedia (PCMM) protocol;
   from the application manager sending, via a second interface of the application manager, a request to a policy server to allocate network assets for creating a call flow path connecting the network endpoints to establish a session, said second interface using a protocol that is different from the web services interface protocol.

2. The method of claim 1, wherein the web services interface protocol employs an eXtensible Markup Language (XML) protocol.

3. The method of claim 1, wherein the web services interface protocol employs a HyperText Transfer Protocol (HTTP).

4. The method of claim 1, wherein sending a session initiation invite involves using a Session Initiation Protocol (SIP).

5. The method of claim 1, further comprising using session description protocol (SDP) fields in a Session Initiation Protocol (SIP) message to perform QoS reservation of resources in the network.

6. The method of claim 1, wherein the application server is a SIP proxy server.

7. The method of claim 1, wherein the second interface is a PCMM interface and sending the request to the policy server comprises sending a PCMM message.

8. A system for allocating network assets for communication between first network endpoint and a second network endpoint, said system comprising:
   an application server for initiating communication between the network endpoints through the set of network assets by sending a resource reservation message in response to receiving a session initiation invite, wherein the communication is implemented by an application residing on an application server; and
   an application manager for receiving via a first interface of the application manager the resource reservation message from the application server, and sending via a second interface of the application manager a request to a policy server to allocate network assets for creating a call flow path connecting the network endpoints to establish a session, wherein said first interface employs a web service interface protocol, wherein the web services interface protocol is not a PacketCable multimedia (PCMM) protocol, and said second interface employs a protocol that is different from the web services interface protocol.

9. The system of claim 8, wherein the web services interface protocol employs an eXtensible Markup Language (XML) protocol.

10. The system of claim 8, wherein the web services interface protocol employs a HyperText Transfer Protocol (HTTP).

11. The system of claim 8, wherein the session initiation invite is a Session Initiation Protocol (SIP) session initiation invite.

12. The system of claim 8, wherein the application server is a SIP proxy server.

13. The system of claim 8, wherein the second interface is a PCMM interface and the application manager sends the request to the policy server via a PCMM message.

* * * * *